J. P. WRIGHT.
MACHINE FOR FORMING PACKAGES.
APPLICATION FILED FEB. 6, 1902.
966,508.
Patented Aug. 9, 1910.
13 SHEETS—SHEET 1.
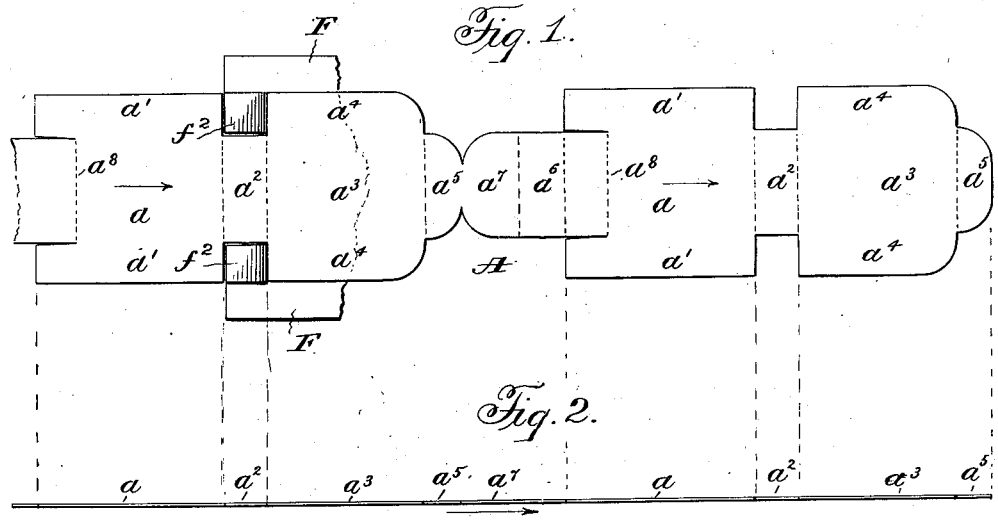
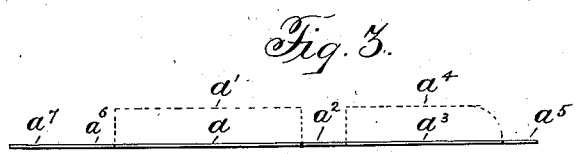
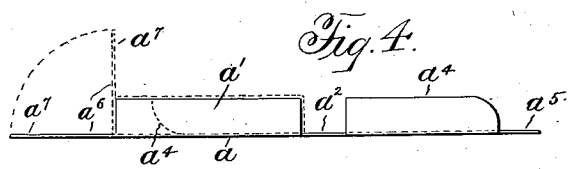
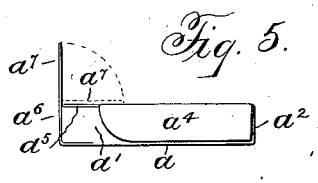
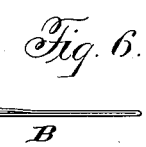
Witnesses:
Jas. E. Hutchinson
Henry C. Hazard
Inventor
Jacob P. Wright,
by Edwin J. Prindle,
his Attorney.

J. P. WRIGHT.
MACHINE FOR FORMING PACKAGES.
APPLICATION FILED FEB. 6, 1902.
966,508.
Patented Aug. 9, 1910.
13 SHEETS—SHEET 2.
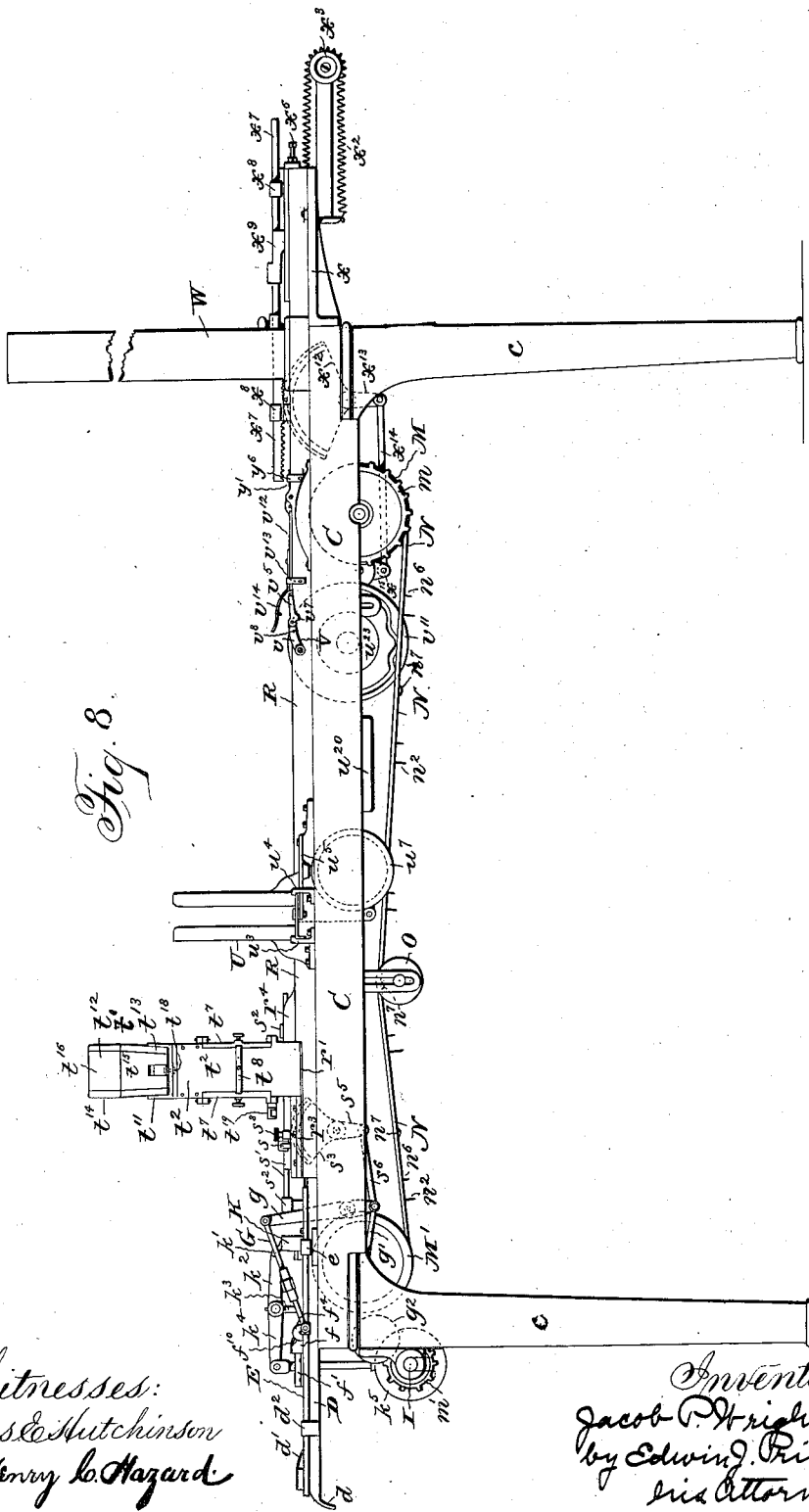

J. P. WRIGHT.
MACHINE FOR FORMING PACKAGES.
APPLICATION FILED FEB. 6, 1902.
966,508.
Patented Aug. 9, 1910.
13 SHEETS—SHEET 3.
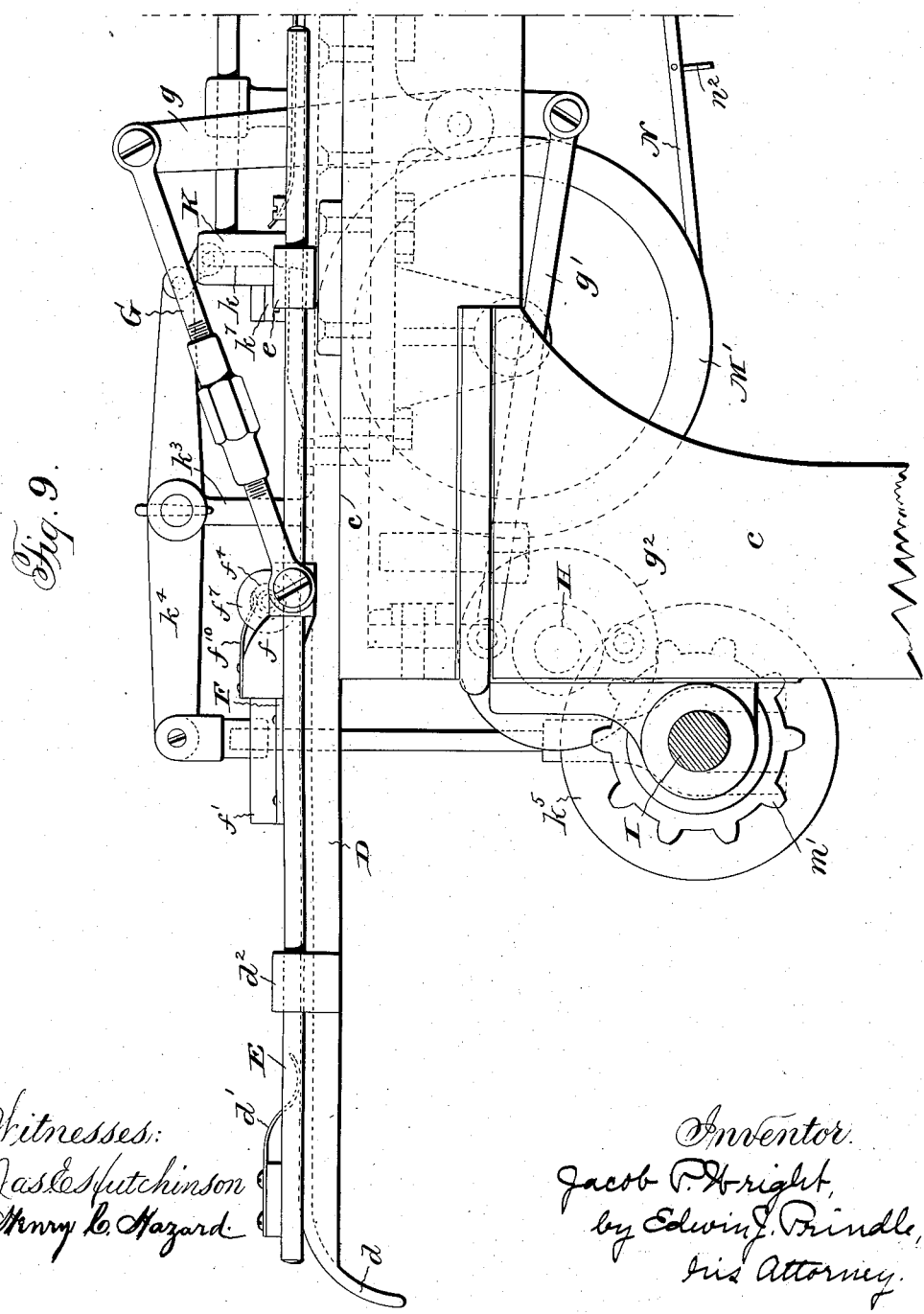

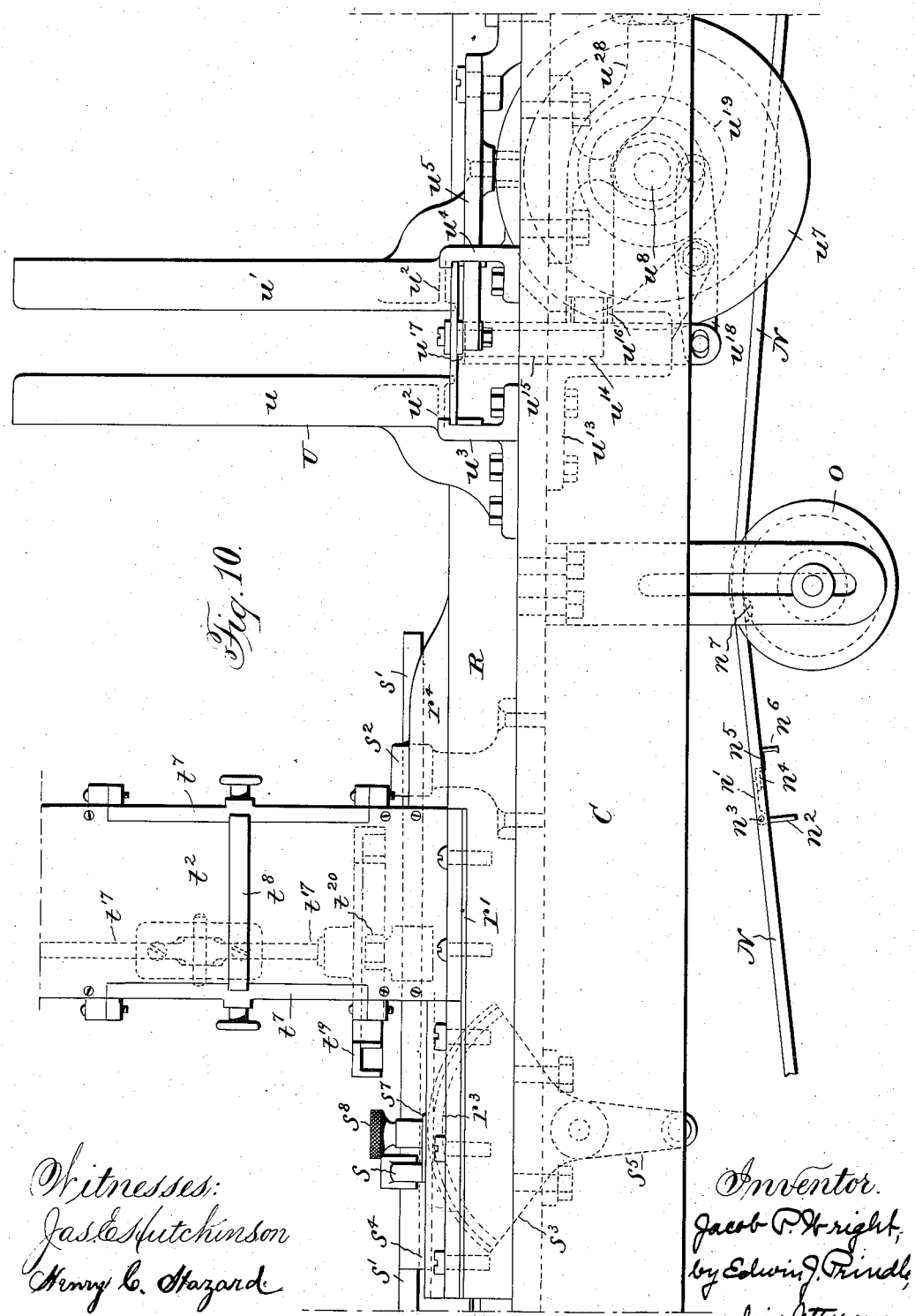

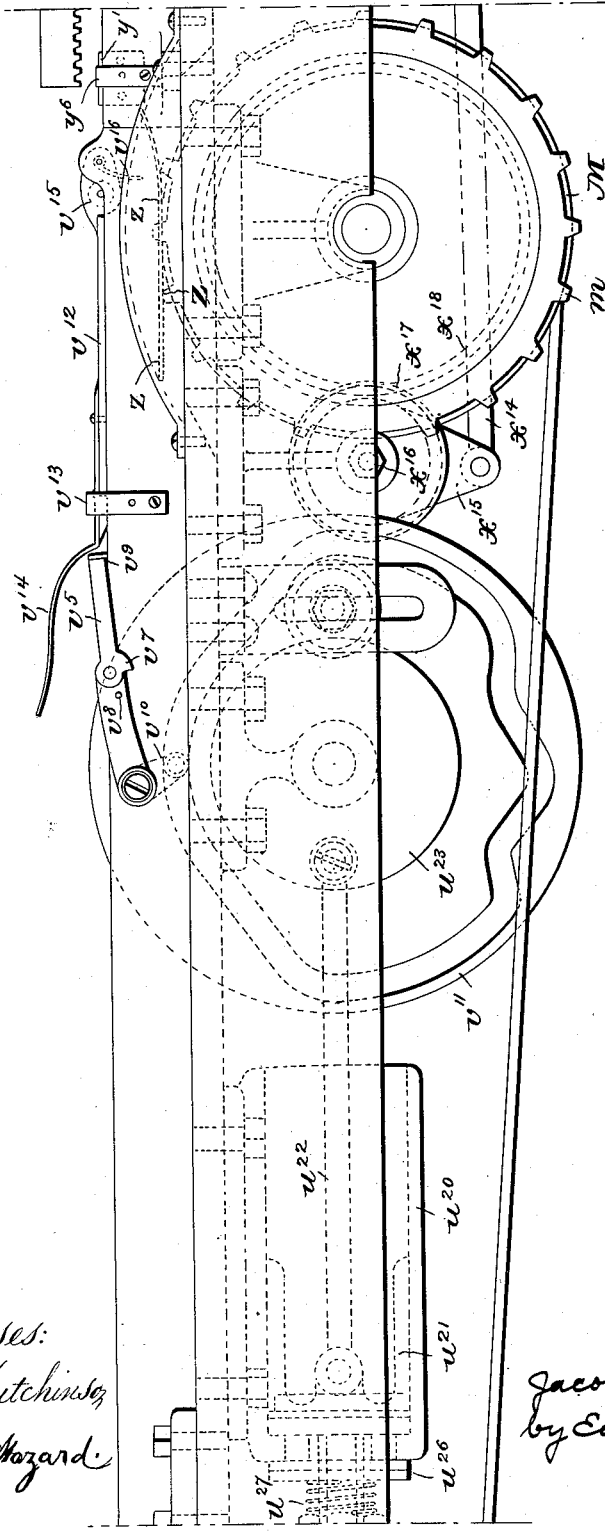

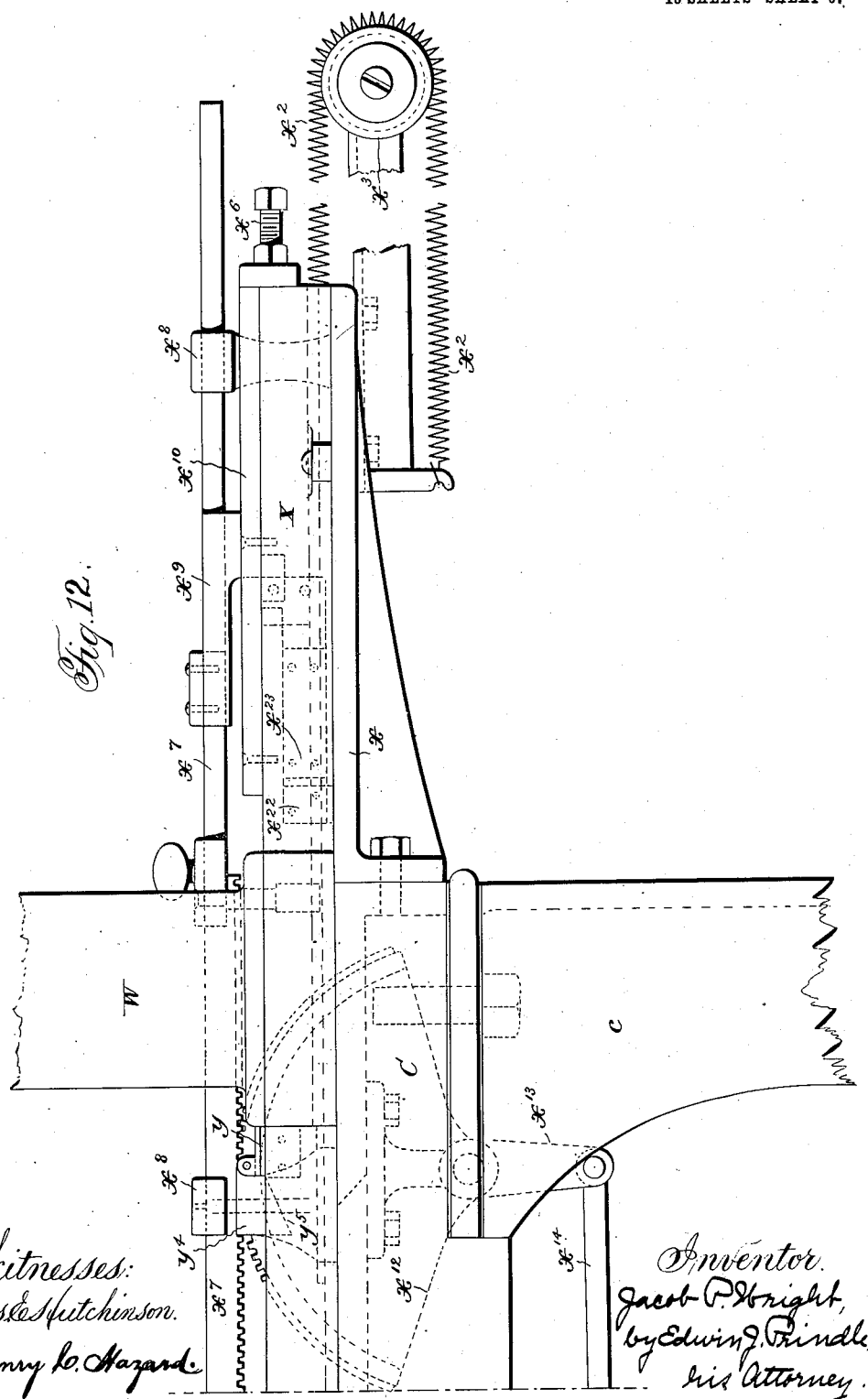

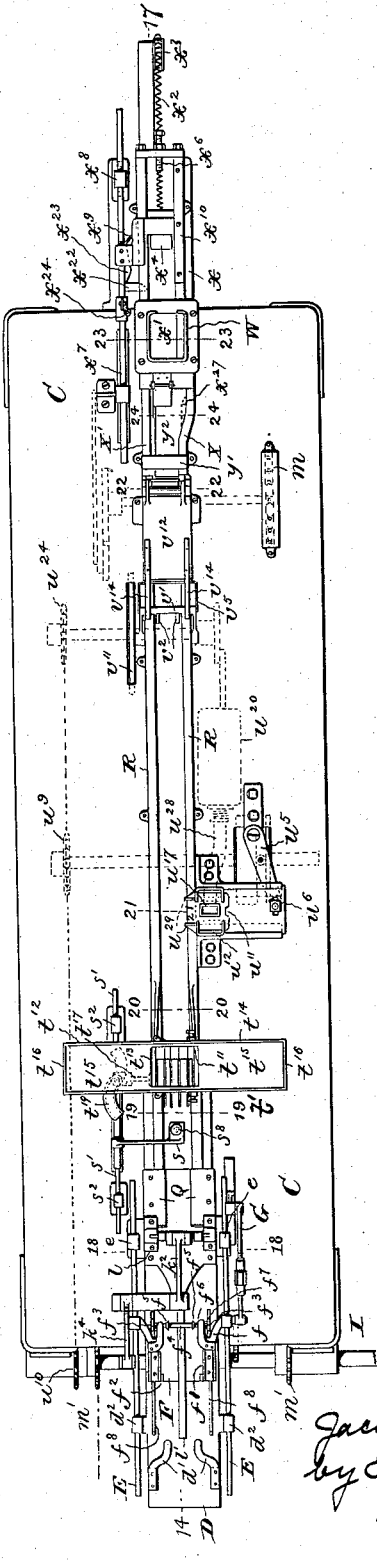

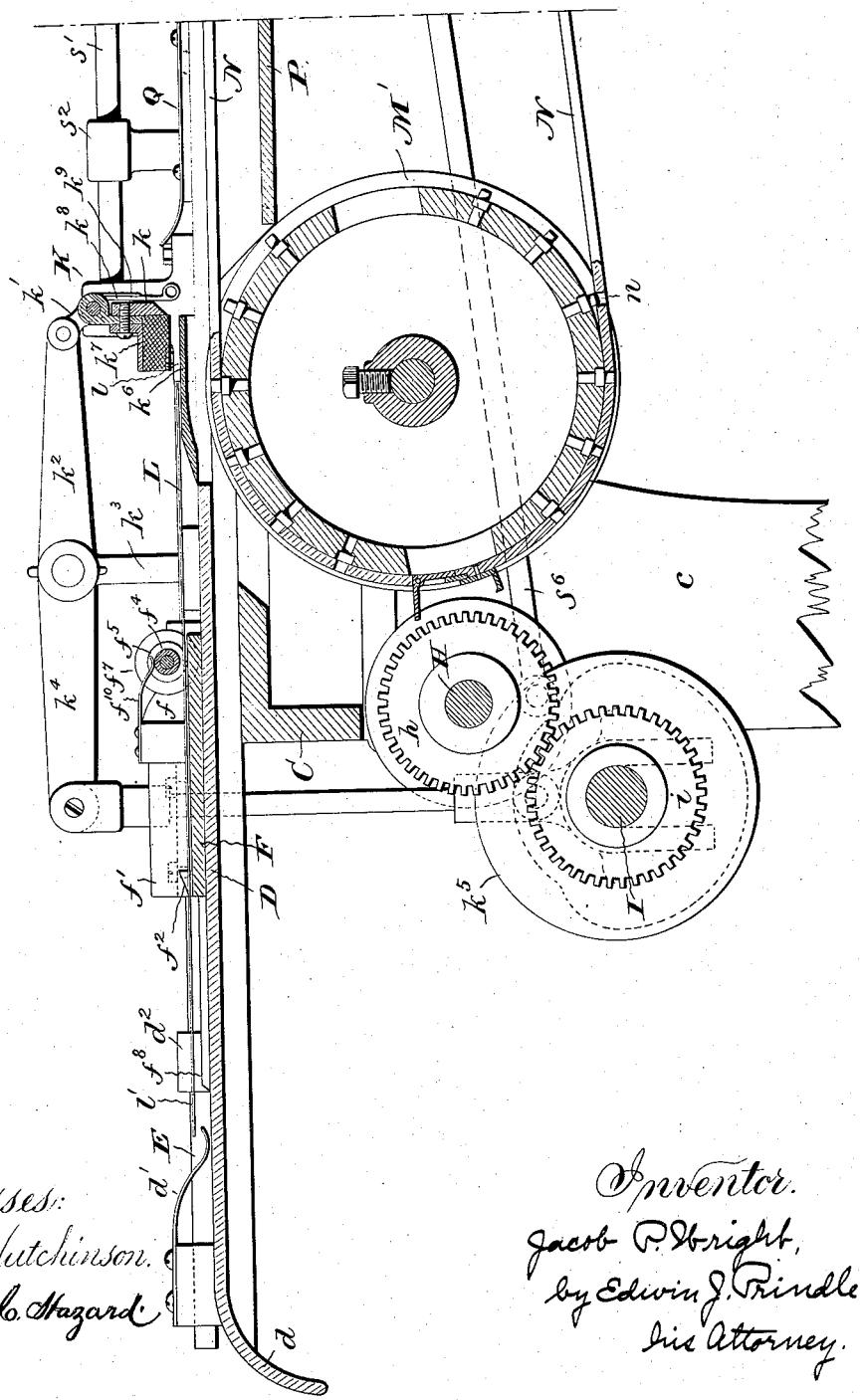

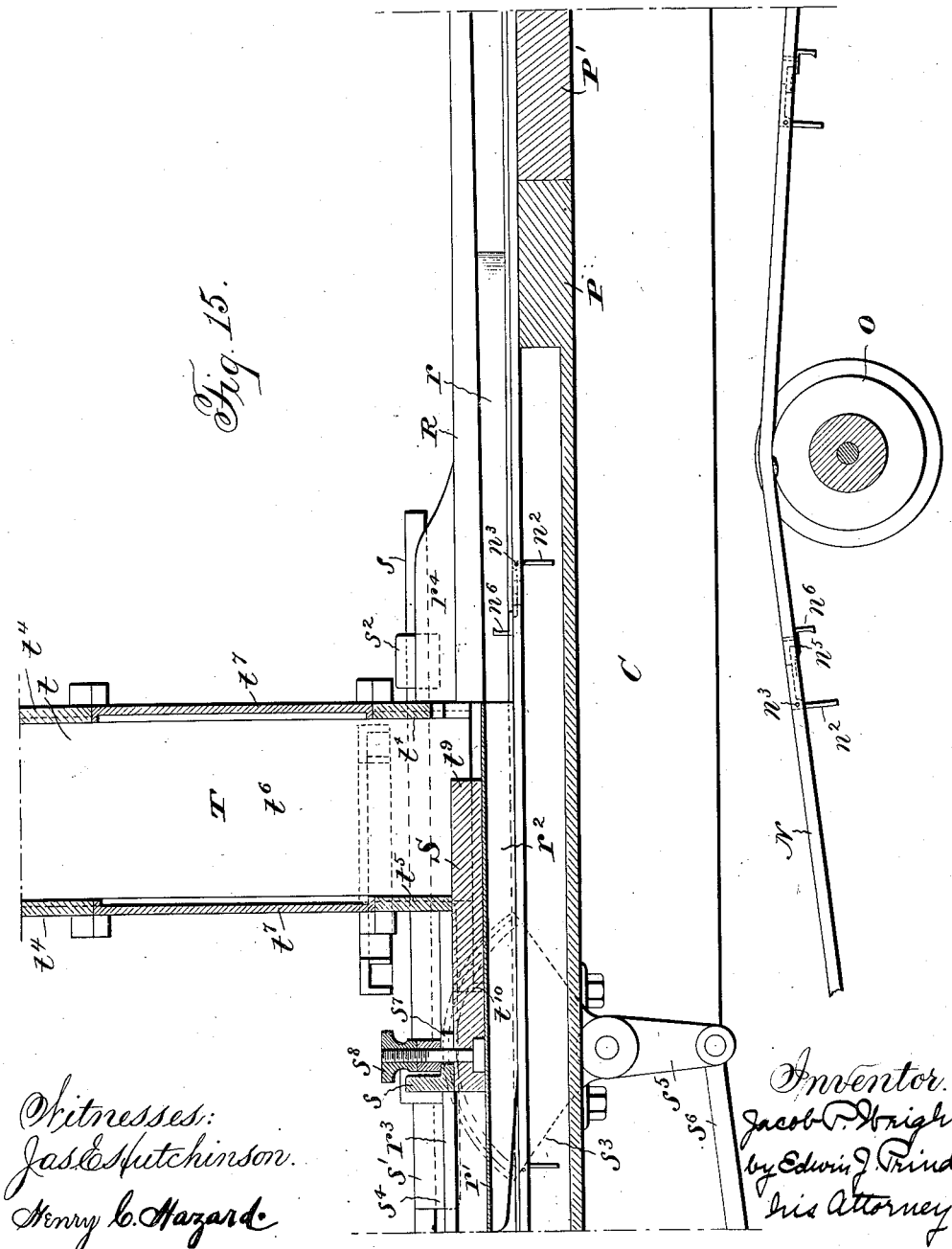

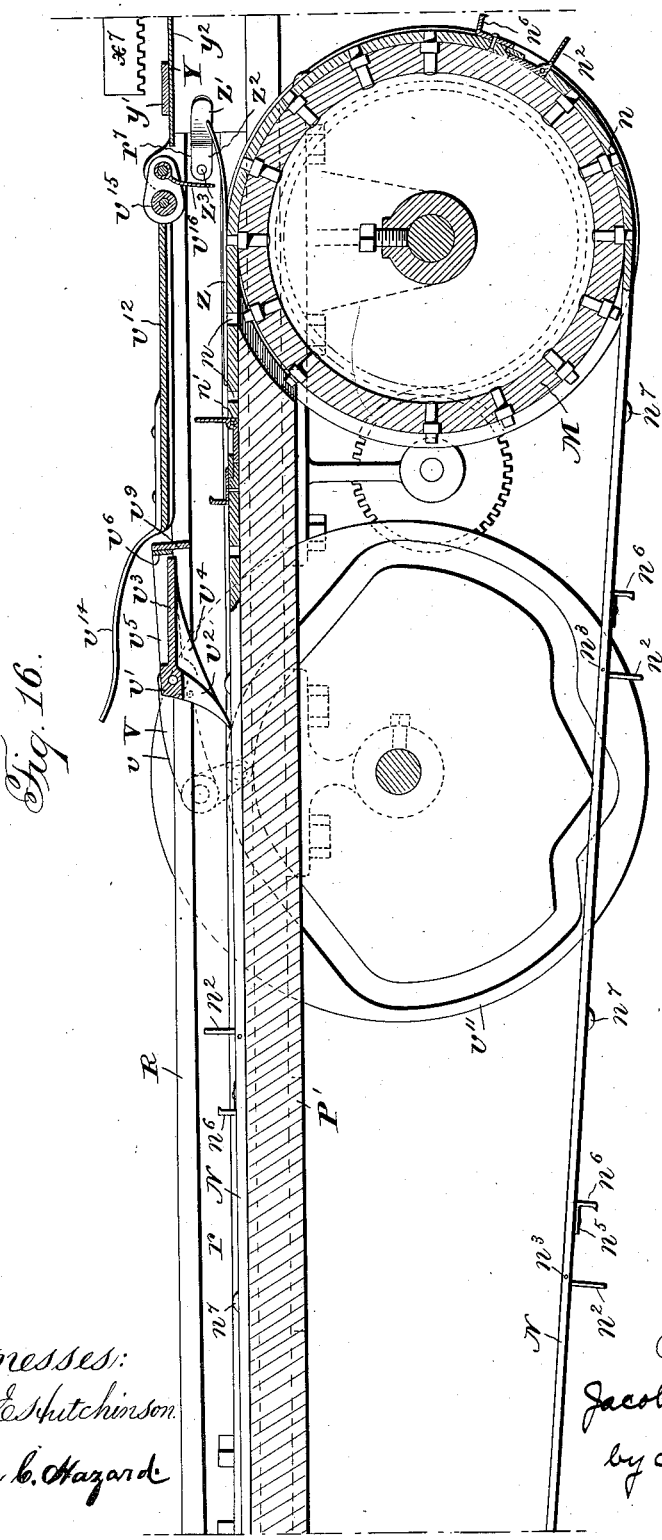

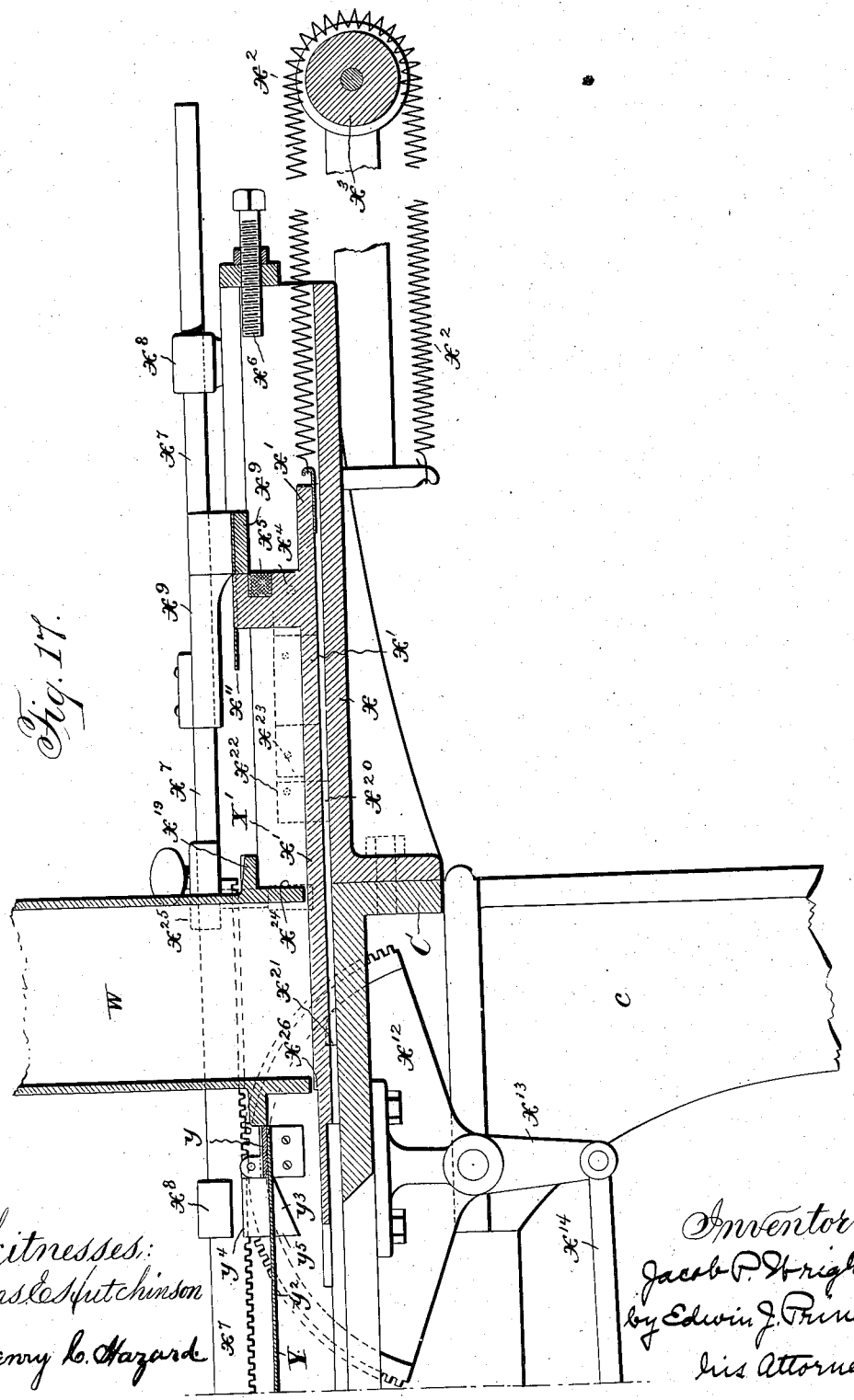

J. P. WRIGHT.
MACHINE FOR FORMING PACKAGES.
APPLICATION FILED FEB. 6, 1902.
966,508.
Patented Aug. 9, 1910.
13 SHEETS—SHEET 12.
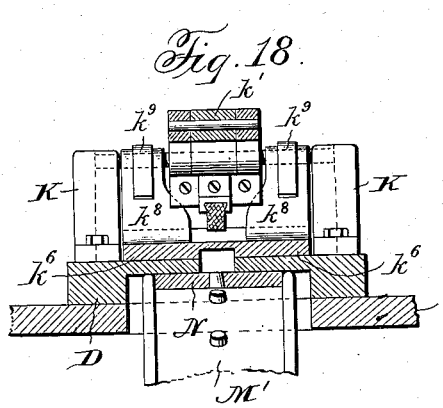
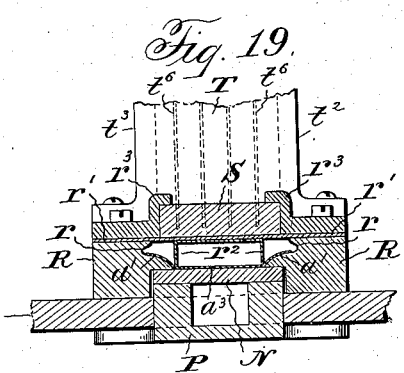
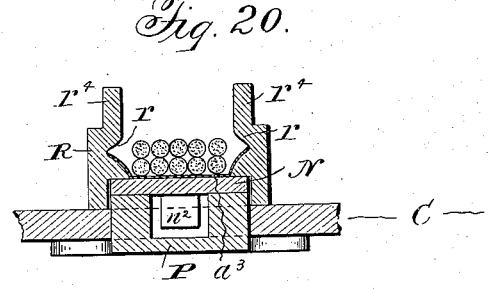
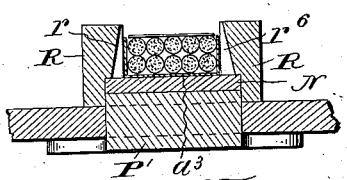
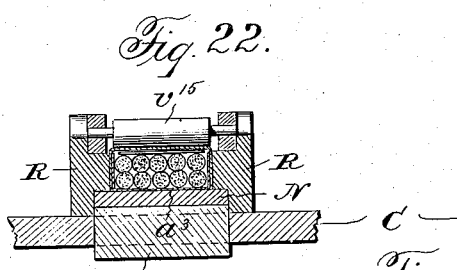
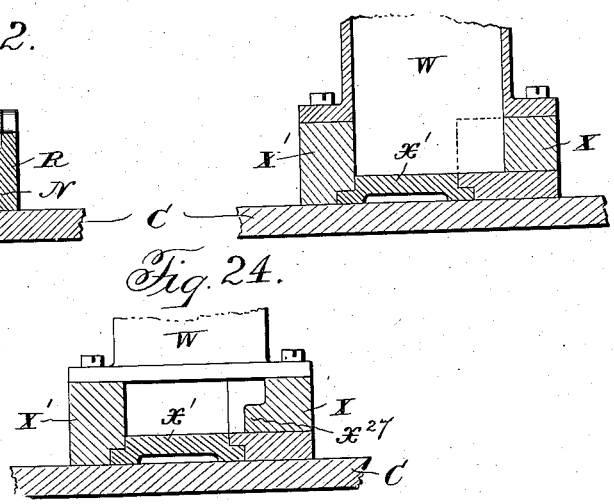
Witnesses:
Jas. E. Hutchinson
Henry C. Hazard
Inventor.
Jacob P. Wright,
by Edwin J. Prindle,
His Attorney,

J. P. WRIGHT.
MACHINE FOR FORMING PACKAGES.
APPLICATION FILED FEB. 6, 1902.

966,508.

Patented Aug. 9, 1910.
13 SHEETS—SHEET 13.

Witnesses:
Jas. E. Hutchinson
Henry C. Hazard

Inventor.
Jacob P. Wright,
by Edwin J. Prindle,
his Attorney.

UNITED STATES PATENT OFFICE.

JACOB P. WRIGHT, OF AKRON, OHIO, ASSIGNOR TO THE DIAMOND MATCH COMPANY, OF NEW YORK, N. Y., A CORPORATION OF ILLINOIS.

MACHINE FOR FORMING PACKAGES.

966,508.

Specification of Letters Patent. Patented Aug. 9, 1910.

Application filed February 6, 1902. Serial No. 92,920.

*To all whom it may concern:*

Be it known that I, JACOB P. WRIGHT, of Akron, in the county of Summit, and in the State of Ohio, have invented certain new and useful Improvements in Machines for Forming Packages, and do hereby declare that the following is a full, clear, and exact description thereof, reference being had to the accompanying drawings, in which—

Figure 25:
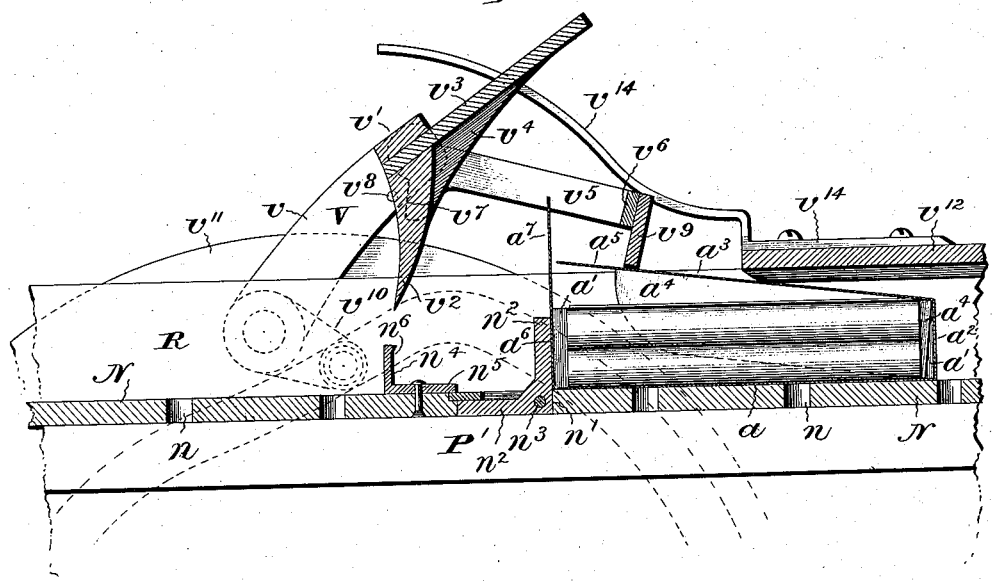
Figure 26:
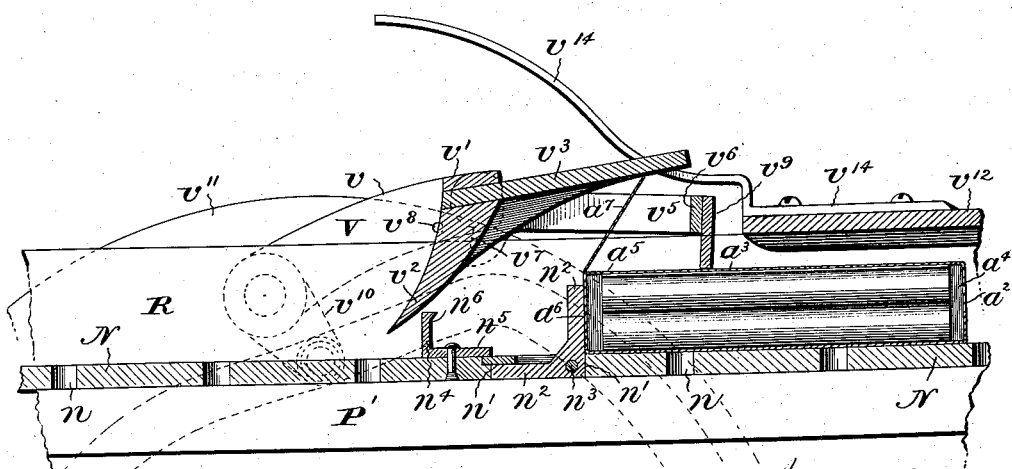

Figure 1 is a plan view of a strip of blanks for box trays for use in my machine; Fig. 2 is an edge view of the strip shown in Fig. 1; Figs. 3, 4 and 5 are side views of the tray blank, showing the successive steps of folding the same; Figs. 6 and 7 are, respectively, a view of a flattened shuck, and a view of an opened shuck for use in my machine; Fig. 8 is a side view of a machine embodying my invention; Figs. 9, 10, 11 and 12 are partial views on a larger scale than Fig. 8, said four views together constituting a complete side elevation on a large scale; Fig. 13 is a plan view of the machine illustrated in Fig. 8; Figs. 14, 15, 16 and 17 are four partial views of a longitudinal section, taken on the line 14—17 of Fig. 13, the said four views together constituting a complete section on a large scale; Figs. 18 to 24 are, respectively, partial, sectional views taken on the sectional lines 18 to 24 of Fig. 13; and, Figs. 25 and 26 are transverse, sectional views showing the flap-folding device in different positions.

Letters of like name and kind refer to like parts in each of the figures.

The object of my invention has been to provide a machine for forming packages, which machine, while adapted for other uses, shall be particularly adapted for forming packages for cigarettes, and for placing cigarette cards in such packages, and which shall have, among other advantages, those of being rapid, certain, and automatic in its action, and of being capable of receiving blank trays, flattened shucks, cigarettes and cigarette cards in quantities, folding the trays into shape, placing the cigarettes and cards therein, opening the shuck and inserting the filled tray into the shuck, and to such ends, my invention consists in the machine for forming packages hereinafter specified.

The machine I have chosen for illustrating my invention is adapted to form a package comprising a box that consists of a tray A and a shuck B. The tray, as illustrated in Fig. 1, consists of a bottom $a$, from the longer sides of which project sides $a'$. At one end of the bottom $a$, a tray end $a^2$ is formed, on which is formed a cover $a^3$. The said cover has side flaps $a^4$ and an end flap $a^5$. On the end of the bottom $a$, opposite to the tray end $a^2$, is formed a tray end $a^6$, on which is formed a flap $a^7$. The bottom $a$ is separated from the side flaps $a'$ for a distance from the end $a^6$, and at this point of union with said side flaps is scored at $a^8$. The lines of union between the various flaps, ends, the top and the bottom, are scored, so that the necessary folds in bringing the tray into final shape can readily be made. The under flap $a^5$ and the score $a^8$ are to enable the consumer to open the tray so as to get at the cigarettes. The shuck consists of a tube rectangular in cross section and having four rectangular sides. The shucks are delivered to the machine flattened out, as shown in Fig. 6, and the tray blanks are delivered to the machine in a continuous strip having all the transverse scores of the finished blank formed therein and having the blanks completely cut, except that the flap $a^7$ of each blank is united to the flap $a^5$ of the neighboring blank, as illustrated in Fig. 1. In the completed package, the sides $a'$ and the ends $a^2$ and $a^6$ are folded perpendicularly to the bottom $a$; the top $a^3$ is folded down upon the edges of the sides $a'$; the flaps $a^4$ are folded against the outer surface of the sides $a'$, and the flap $a^7$ is folded down upon the outer surface of the top $a^3$. The shuck is opened until its sides form a rectangle and the tray is inserted into the shuck.

In carrying my invention into practice, I provide a frame consisting of a bed C supported upon legs $c$. Upon the upper surface of the bed, at one end thereof, is mounted a plate-like casting D which extends beyond the bed and is provided with a forwardly and downwardly curved apron $d$. The strip of tray blanks is fed to the machine over the apron $d$ and longitudinally along the plate D. Upon the forward end of the casting D, at the sides thereof, are formed lugs upon which are secured springs $d'$ that project rearwardly and bear upon the strip of blanks. Upon the sides of the casting D are formed eyes $d^2$ in which rods E have bearing, the rearward ends of the rods passing through bearings $e$ that are secured upon the bed. A slide F lies upon the top of the casting D and is provided with outwardly extending arms $f$ on which are formed eyes that receive the rods E, which eyes are fastened to said rods, so that the slide is reciprocated by movement of the rods. The slide F has secured upon its upper face blank guides $f'$, the adjacent sides of which have vertical flanges for guiding the strip of blanks. The said guides are secured to the slide as by screws passing through slots in the guides and threaded into the slide to provide for lateral adjustment of the guides for different widths of blanks. A lug $f^2$ is formed on each guide $f'$ and projects inwardly, the said lugs being preferably rectangular in horizontal cross section and being beveled forwardly while their rearward faces are vertical. The lugs $f^2$ are adapted to ride under the side flaps of the blanks and to engage their square ends to feed the strip of blanks. On the forward end of the slide are formed two pairs of vertically projecting bearing lugs $f^3$ in which is mounted a scorer shaft. On the central portion of the scorer shaft is mounted a spool $f^4$ upon each end of which is formed a scoring disk $f^5$. Spools $f^6$ on the scoring shaft bear at one end against the lugs $f^3$, and at the other end against the scoring disks, and thus hold the latter from lateral movement. On the ends of the scorer shaft, rollers $f^7$ are secured, which rollers are in line with tracks $f^8$ formed on the upper surface of the casting D. The said tracks are beveled at their rearward ends, and the rollers ride upon the tracks during the portion of the travel of the slide E which is over the parts of the blank it is not desired to score. Springs $f^{10}$ are secured upon the slide F and bear at their free ends upon the spools on the scorer shaft to yieldingly press the scoring disks upon the blanks. A link G is pivoted to one of the eyes on the slide F and forms a connection with the upper end of a lever $g$ that is fulcrumed on a bracket secured to the under side of the bed, the lever projecting through a slot in the bed. The lower end of the lever has pivoted to it one end of a link $g'$, whose opposite end is pivoted upon a crank pin on a crank disk $g^2$, the latter being secured upon a shaft H mounted in bearings on the bed. The shaft H is driven from a driving shaft I mounted on the legs $c$, motion being transmitted by a pinion $i$ on the driving shaft to a gear $h$ on the shaft H.

Brackets K are secured at opposite edges of the upper surface of the casting D at points adjacent the brackets $e$, and said brackets have formed in their opposing faces vertical guide-ways for the knife $k$, by which the blanks are severed from the strip. The said knife has pivoted between ears secured thereto a link $k'$ that is also pivoted to a rock arm $k^2$, the latter being secured to a rock shaft which is mounted in a bracket $k^3$ that is fixed upon the bed and overhangs the casting D. A second rock arm $k^4$ is fixed upon the said rock shaft and extends forward, its free end having pivoted to it a rod that passes downward beyond the forward end of the bed, the lower end of such rod being provided with a cam roller that engages a cam in the side of a cam disk $k^5$ on the driving shaft, and being forked to straddle the said shaft for the purpose of holding the said roller from lateral movement. A knife block $k^6$ is secured upon the casting D between the brackets K, its rearward edge being in the plane of movement of the knife edge, and being beveled to co-act with the knife in cutting. A bracket $k^7$ is secured to the front of the knife, and such bracket carries the rubber, or other elastic block, which presses upon the strip in advance of the knife to hold the strip during the cutting operation. The forward edge of the knife block is beveled so that the strip of blanks may readily ride up upon the same. The knife block, forward of the brackets K, preferably extends the full width of the casting D. A spring plate L is secured upon the knife block over such wider portion thereof by ears $l$ formed on the said plate. The said spring plate is supported above the knife block by filling pieces, so that the strip of blanks can pass beneath the same and over the knife block, and it has a forwardly extending, narrow tongue $l'$ that extends forward beneath the spool $f^4$ upon the scorer shaft and over the slide F, and that is adapted to rest upon the strip of blanks and prevent buckling of the latter. The spring plate preferably extends nearly, or quite, to the rearward edge of the knife block. The pin by which the knife and its connecting link are pivoted together extends beyond the said link on each side, and plates $k^8$ are hung upon the said extensions by eyes formed in their upper ends. The lower ends of the said plates are rounded, as by being formed into eyes, and the said plates are yieldingly pressed against the rear face of the knife by springs $k^9$ which bear against the front face of the knife and are bent over the upper eyes in the plates $k^8$ and bear against the rear face of the said plates. When the knife descends to sever the blank from the strip, the lower ends of the plates $k^8$ bear the blank to be severed down in advance of the knife and then, owing to their rounded lower ends, slip forward over the blank and thus yield while the knife is cutting. They thus serve to hold the blank down so that the carrier, which is yet to be described, can take hold of the blank.

Near the rearward and forward ends of the bed, there are provided pulleys M and

M', respectively, which pulleys are mounted upon the shafts having bearings in brackets secured to the under side of the bed. A carrier belt N passes over the said pulleys and is provided with means for engaging the severed blank and carrying it through the remaining operations which are performed upon it. The shaft of the rear pulley M is provided with a sprocket wheel $m$ that is driven by a sprocket chain from a similar wheel $m'$ upon the main driving shaft, and motion is thus communicated to the carrier N. An idler pulley O is adjustably supported upon a bracket that is secured to the under side of the bed, and such pulley bears upon the under side of the carrier belt and serves as a tightener therefor. The center of the pulley is of a smaller diameter than the rest of its face to permit the passage of folders $n^2$ on the belt.

The carrier belt is provided with a series of openings $n$ which are adapted to engage pins upon the pulleys M and M', so that the belt may be driven by the former pulley, and so that its blank-engaging devices may always bear a definite relation to the said pulleys. At intervals along the said belt, which are greater than the length of the tray blank, there are formed in the belt preferably rectangular openings $n'$, in each of which openings is pivoted a folder $n^2$, which folder preferably consists of two arms in the form of plates which are perpendicular to each other, the said folder being pivoted in the said opening at the rearward edge thereof by means of a pin $n^3$ which passes horizontally through the substance of the belt and through an opening formed in the folder at the junction of the said arms. I have found this manner of pivoting the folder in the carrier an exceedingly simple and effective one. A stop $n^4$ is secured upon the belt, as by riveting, at the forward edge of each opening $n'$, and such stop consists of a base $n^5$ from the forward end of which rises a vertical arm $n^6$, which, preferably, has a rearwardly and upwardly inclined lug formed on its upper end. An L-shaped arm projects into the opening $n'$ from the rear end of the base $n^5$, the free end of such arm extending horizontally in the opening $n'$ and above the lower face of the belt, so that its under face forms a stop for the lower arm of the folder $n^2$, while its upper face forms a stop for the upper arm of the said folder. At points in the rear of the folders, studs $n^7$ are secured upon the face of the belt, as by riveting, to create a tendency for the portion of the blank above each stud to bow up.

The casting D and the knife block are cut away to permit the passage of the stops on the carrier belt, and an opening is formed in the bed which extends from a point over the pulley M' to a point in the rear of the pulley M to permit the carrier belt to travel above the face of the bed. The said opening is filled from a point in the rear of the crest of the pulley M' to a point near the center of the bed by a plate P that is secured in the said opening by ears that are bolted to the under face of the bed. From the rear end of the plate P to a point nearly over the pulley M a second plate P' is similarly secured in the bed. The plates P and P' serve to support the upper portion of the carrier belt during its rearward travel. As the folders pass around the pulley M' they strike the under face of the bed and are turned so that their upper arms lie flush with the upper surface of the belt. As this action throws the lower arm perpendicular to the belt the pulley M' is provided with two openings for the reception of said arms. The pins upon the pulley M', by engagement with the holes $n$ in the belt N, serve to keep the diametrically opposite openings in the pulley and the folders in register with each other. The plate P is provided with a longitudinal slot upon its upper surface to permit the passage of the lower arms of the folders. Plates Q are secured upon the upper face of the casting D in the rear of the knife and are raised upon filling pieces so that the blank can pass beneath such plates and over the upper face of the casting. The forward edges of the said plates are curved upward so as to insure the passage of the blank beneath them. As the carrier belt travels out from under the knife block, moving rearward, the vertical arm $n^6$ of each stop on the carrier belt comes in contact with the flap $a^7$ on the bottom $a$ of the tray blank and moves the said blank rearward with itself, the flap being prevented from rising upward and disengaging itself from said arm by the beveled shoulder at the top of the said arm.

Folding rails R and R are secured upon the bed and extend from the plates Q rearward. The said folding rails are provided upon their opposing faces with grooves $r$ which, at their forward ends, are in line with the passages beneath the plates Q; and such grooves receive the side flaps of the cover and bottom of the blank as it passes rearward beneath the said plates. The said grooves turn gradually upward and inward as they pass rearward, so that the side flaps of the blank are folded upward and inward, the said flaps being kept under perfect control by being held between the inner and outer walls of the said grooves. Upon the upper surfaces of the rails, at their forward ends, is secured a plate $r'$, and upon the under side of the said plate flanges $r^2$ are formed. As illustrated said flanges are portions bent from a plate that is secured to the under side of the plate $r'$. The flanges $r^2$ are beveled at their forward ends, and the distance between them is not greater than the width of the bottom of the tray blank. As the tray blank passes between the rails, the flanges hold the cover and bottom of the blank upon the plate P and prevent their rising to interfere with the folding of the side flaps.

Guide rails $r^3$ are secured upon the upper face of the plate $r'$, and a cigarette-feeding plunger S is mounted to reciprocate between the said rails and upon the upper face of the plate $r'$. The said plunger is reciprocated by means of an arm $s$ that is secured upon a rack bar $s'$, the said bar being guided at its ends in eyes $s^2$ secured upon the bed. The teeth of the rack bar are formed on its under side and are engaged by a sector $s^3$ that is fulcrumed on a bracket on the under side of the bed. Flanges $s^4$ project downward from the rack bar on each side of the sector, and by engagement with the sector prevent the turning of the rack bar on its axis. An arm $s^5$ is formed on the sector, and a connecting rod $s^6$ is pivoted at one end to the said arm and at its other end to a crank disk on the shaft H. The arm $s$ is provided at its plunger-engaging end with a rearwardly projecting fork $s^7$, and connection is made with the plunger by a thumb nut $s^8$ which is threaded on to a bolt driven into, or otherwise secured, to the cigarette plunger, by which nut the fork can be clamped upon the plunger. By merely loosening the thumb nut $s^8$, the plunger can be left inactive, while the remainder of the machine is in motion.

A cigarette-delivering mechanism T is mounted upon the rear end of the plate $r'$. Such mechanism comprises a magazine $t$ upon which is supported a hopper $t'$. The said magazine comprises right and left sides $t^2$ and $t^3$, respectively. The said sides are provided with flanges that are secured upon the top of the plate $r'$ and to the folding rails R. Said sides are connected at the top in front and rear and at the bottom in rear by plates $t^4$, which plates are provided with vertical slots or grooves in their inner faces. The hopper sides are connected at the bottom in the front by a plate $t^5$, which is likewise provided with grooves on its inner face, and the bottom plate $t^4$, between the grooves on its lower edge, is provided with semi-circular notches of sufficient diameter to permit the passage of cigarettes. The plate $t^5$, and the lower plate $t^4$ are raised sufficiently above the plate $r'$ to permit the passage of the cigarette plunger beneath them. Partition plates $t^6$ are placed in the vertical grooves in the plates $t^4$ and the plate $t^5$, such plates being spaced apart sufficiently to permit the free passage between them of a single cigarette at a time. The front and rear sides of the magazine, between the plates $t^4$ and $t^5$, are closed by doors $t^7$ which are hinged upon ears formed on the plate $t^3$. The said doors are preferably held closed by a leaf spring $t^8$ that is secured to the side $t^2$ and whose ends project over and fit into depressions in the edges of the doors.

The cigarette-feeding plunger consists preferably of a plate whose rear face is vertical and whose upper surface is provided with slots $t^9$ for the reception of the lower edges of the partition plates. A hole $t^{10}$ is preferably formed at the forward end of each slot $t^9$ to permit the escape of dirt from the slot. A trough $t^{11}$ is secured upon the upper end of the magazine and extends transversely of the bed, and such trough is provided with a rectangular opening in its bottom which corresponds with the opening in the top of the magazine. A hopper $t^{12}$ is mounted in the trough and preferably consists of a plane, rectangular base $t^{13}$ having an opening corresponding to the opening in the bottom of the trough and in the magazine, and of vertical sides $t^{14}$, which are connected by inclined bottom sections $t^{15}$ that extend from the ends of the opening in the base to the outer edges of the sides, at which point vertical end plates $t^{16}$ close the ends of the hopper. Headed screws, or studs, are fastened in the ends of the base $t^{13}$ and pass through slots in the trough bottom, and such studs, while holding the hopper down upon the said bottom, permit movement of the hopper along the bottom. A lever $t^{17}$ is fulcrumed upon a bracket fastened to the magazine side $t^3$, and the upper end of such lever is forked to straddle a pin that is carried between ears on a bracket $t^{18}$, that is fastened to the under side of the hopper base. The trough bottom is slotted to permit movement of the bracket $t^{18}$ with the hopper. On the lower end of the lever $t^{17}$ a cam $t^{19}$ is fastened, said cam being a box cam in the form of a compound curve. A roll $t^{20}$ is fastened upon the rack bar $s'$, and by the reciprocation of the latter causes the cam, and with it the lever, to oscillate transversely of the bed, and the upper end of the lever, by engagement with the pin in the bracket $t^{18}$, causes a reciprocation of the hopper in the trough. Cigarettes which are placed in the hopper are thus shaken down between the partition plates of the magazine, and the lower cigarettes of the columns thus formed rest upon the upper face of the plunger. When the latter is drawn forward, the cigarettes drop upon the plate $r'$, and when the plunger is forced rearward the lowermost row of cigarettes is forced out through the semi-circular openings in the bottom of the plate $t^4$ upon the tray blank which is upon the carrier just at the rear of the hopper. In order to prevent lateral escape of the cigarettes, the rails R are provided with vertically rising flanges $r^4$ which extend from the hopper rearward along the rails for a distance greater than the length of a cigarette.

At a point on the bed to the rear of the cigarette-feeding mechanism, a card feeding mechanism is provided for placing cigarette cards in the package before the latter is closed. The card feeding mechanism *per se* forms the subject of a patent granted to me on the 19th day of November, 1907, No. 871,746. The form of such mechanism which has been chosen for illustration comprises a magazine U which consists of front and rear sections $u$ and $u'$, respectively, which are bolted to the bed, and each of which has a transverse wall, from which project flanges forming sections of a longitudinal wall of the magazine, there being a space between each pair of flanges to afford access to the cards. The cards are stacked horizontally in the magazine, and the lowermost card is supported at its ends upon ledges $u^2$ formed at the bottoms of the transverse walls of the magazine, and having a level slightly above the rails R. The flanges forming the longitudinal walls of the magazine preferably have the portions of their lower edges which are adjacent the ledges formed at a level slightly higher than the said ledges, and their corners toward the center of the magazine are formed at a lower level than the ledges. From each section $u$ and $u'$, arms $u^3$ and $u^4$, respectively, project to the right, transversely of the bed. A card feeding plunger is mounted in ways formed in the said arms to reciprocate across the bottom of the magazine below the ledges, before mentioned. The said plunger rests upon guide plates fastened to the inner faces of the said arms, has lateral bearing against the said faces, and is held down upon the said guide plates by flanges projecting inward on the said arms. The rear arm $u^4$ is slotted to permit the passage of a lever $u^5$ which is fulcrumed upon a bracket secured upon the bed and is pivoted to a block $u^6$ that is slidably mounted in a slot in the plunger. Between its ends, the lever $u^5$ is provided with an anti-friction roller which engages a cam formed in the face of a cam body $u^7$, the latter being mounted upon a shaft $u^8$ that has bearing in brackets on the under face of the bed. The shaft $u^8$ carries a sprocket wheel $u^9$ that is connected by a sprocket chain with a similar wheel $u^{10}$ on the driving shaft. The inner end of the card feeding plunger is provided with a finger $u^{11}$ that projects in the plane of the upper face of and at or near the center of the plunger, and with fingers $u^{12}$ which project horizontally from the plunger near its outer edges. The finger $u^{11}$ is, preferably, quite short, and the fingers $u^{12}$ are, preferably, the full width of the card. On the under side of the bed a bracket $u^{13}$ is secured, and such bracket is provided with a vertical, preferably rectangular, guide way in line with the axis of the magazine, in which guide way is mounted a suction plunger $u^{14}$. Such plunger has formed in it an exhaust chamber $u^{15}$ which opens through its upper face and is connected with a lateral passage formed in a boss $u^{16}$ on the plunger. A rubber band $u^{17}$ is preferably fitted upon a shoulder formed at the upper end of the plunger and extends slightly above the plunger. The lower end of the plunger is provided with ears in which is mounted a pin that is received in a slot in one end of the lever $u^{18}$, the said lever being fulcrumed on a lug formed on the bracket $u^{13}$. The opposite end of the lever carries an anti-friction roller, which is adjustably secured thereto, and which engages a cam in a cam body $u^{19}$ mounted on the shaft $u^8$. A suction cylinder $u^{20}$ is secured upon the under side of the bed, and extends longitudinally of the bed. The piston $u^{21}$ of the said cylinder is connected by a driving rod $u^{22}$ to a crank disk $u^{23}$ upon a shaft mounted in brackets on the under side of the bed, the said shaft carrying a sprocket wheel $u^{24}$ that is driven by the same chain that drives the sprocket gear $u^9$. The rear end of the cylinder $u^{20}$ is open, and its forward end is provided with openings for the passage of air. A nipple is secured in the forward end of the plunger, and a disk valve $u^{26}$ is mounted upon the said nipple and is pressed against the cylinder head, to close the openings therein, by means of a spring $u^{27}$ coiled about the nipple and acting against a nut threaded upon the nipple. A hose $u^{28}$ connects the nipple with the boss $u^{16}$. On the flanges forming the wall of the magazine nearest the rails R are formed shoulders $u^{29}$ and $u^{29}$ which are inclined downwardly and toward the said rails, the lowermost portion of the said shoulders being lower than the under side of the finger $u^{11}$ on the card feeding plunger.

In the operation of the card feeding device, the suction plunger is raised and comes nearly or quite in contact with the under face of the lowermost card. The piston then moves rearward in the cylinder and exhausts air from the chamber in the suction plunger, causing the air above the lowermost card to force such card upon the suction plunger. The latter then descends, drawing downward with it the card until its central portion is below the lowest portion of the flanges forming the transverse wall of the magazine nearest to the rails R. The card feeding plunger is then advanced, and its fingers $u^{12}$ pass under the card, while its finger $u^{11}$ passes over the same. The piston in the cylinder then moves forward, relieving the suction, and the suction plunger lets go of the card and descends below the level of the card feeding plunger. The latter now having secured its hold upon the card is moved over the carrier belt, and in doing so carries the card beneath the shoulders $u^{29}$, which press the card down, until it has passed beyond such shoulders, when the card springs up again. The card feeding plunger is now withdrawn from over the carrier belt, and the shoulders $u^{29}$, preventing movement of the card with its plunger, strip it from off the fingers of the plunger, and it falls upon the cigarettes lying on the tray blank.

As the carrier belt passes rearward, the lower arm of the folder $n^2$ strikes the end wall of the slot in the upper face of the plate P, and the folder is thus thrown upon its pivot pin, and the upper arm is thrown into a vertical position. This action causes the end wall $a^6$ of the blank to be moved into a vertical position, and causes the flap $a^7$ to be released from the lug on the arm $n^6$ of the stop. The blank is now in engagement by the folder instead of by the stop. The carrier belt, moving continuously, carries the tray blank along the rails R, and the grooves $r$ continue to fold the side flaps into more and more vertical positions, and the pressure of the grooves on the edges of the said flaps holds the blank down upon the carrier without the aid of such means as the flanges depending from the plate $r'$, before mentioned. This action continues until the grooves $r$ run out and merge into the vertical inner faces of the rails. At a point slightly beyond where the grooves $r$ terminate, the rails are cut back, as at $r^6$, and their inner faces are beveled downward and outward. When the cover of the tray has come to the widened space between the rails, formed by the cut back portions $r^6$, and while the side flaps of the bottom are still held vertically by the narrower passage at the termination of the grooves $r$, the cover is folded over upon the side flaps $a'$. As the side flaps $a'$ are held vertically, the cut back portions $r^6$ afford a space between each rail and the adjacent flap $a'$, and when the cover is folded over its flaps $a^4$ enter the said spaces and pass down outside of the flaps $a'$. The cut back portions $r^6$ and the beveling of the inner faces of the rails at this point allow the flaps $a^4$ to spread, as they naturally do, and prevent the rails from exerting undue friction upon the cover and dragging it rearward too far to allow the end $a^2$ to be vertical. Moreover, the beveling of the inner faces tends to hold the cover down to horizontal position. The tray then travels rearward, and the inclined inner faces of the rails gradually become vertical until the side flaps $a^4$ are closely pressed against the sides of the package and in position to enter the shuck.

The means for turning over the cover and for folding up the end $a^6$ and folding down the flap $a^7$ comprise a yoke V that is preferably pivoted upon the outer faces of the rails R. Such yoke consists of parallel arms $v$ that are connected by a cross bar $v'$. The said cross bar has a tooth $v^2$ which projects downward and forward from the cross bar $v'$, the said tooth being, preferably, tapered to an edge at its bottom, and having a concave front face and a convex rear face. An arm $v^3$ projects rearward from the cross bar, and a strip of sheet metal $v^4$ is secured at its rearward end upon the arm $v^3$ and is curved forward and downward to the tooth $v^2$, with whose front face it merges. A link consisting of parallel arms $v^5$, connected by a cross bar $v^6$, has its arms $v^5$ fulcrumed upon the arms $v$ of the yoke, as by screws passing through the arms $v^5$ and into the arms $v$.

While I have detailed one specific way of constructing the yoke and the link, it will readily be understood that each of such parts can be formed in other ways; as, by casting each of them in a single cast, or otherwise forming each of them in a single piece of material. The arms of the said link have downwardly projecting shoulders $v^7$ that are adapted to engage pins $v^8$ secured in the arms $v$, so that the link is raised when the yoke is raised beyond a certain point. On the cross bar $v^6$ a plate $v^9$ is secured near its central portion and projects downwardly below the level of the cross bar. The yoke has a crank arm $v^{10}$ formed on one of its arms $v$, which crank arm carries a roll that is engaged by a cam formed in the side of a cam body $v^{11}$, the latter being mounted upon the shaft of the crank disk $u^{23}$. A cover $v^{12}$ is pivoted between ears on the rails R, and such cover is fastened down upon the rails by a spring catch $v^{13}$ secured to one of the said rails. The forward end of the cover terminates just to the rear of the rearmost position of the link and is rearwardly and downwardly beveled. Upon the forward end of the top of the cover are secured two strips $v^{14}$ which are curved upwardly and forwardly over the path of the link.

In the operation of the cover and flap-folding device, the tooth $v^2$ is lowered to the upper surface of the belt. As the tray blank moves rearward, the flap $a^5$ rides up upon the concave forward face of the tooth $v^2$, this action being assisted by the button $n^7$ upon the belt, which tends to raise the cover off of the belt, such action taking place when the cover has just passed out of the grooves $r$ and is, therefore, free to rise, the flaps $a'$ of the bottom being still in the grooves $r$ and being held down firmly thereby. As the tray blank continues to move rearward, the tooth $v^2$ is raised above the level of the flaps $a'$ and causes the cover to be turned down upon the said flaps. Continued movement of the blank causes the plate $v^9$ to rest upon the cover and prevent its rising as the cover passes out from under the tooth $v^2$. The yoke is then raised, to allow the tooth $v^2$ to pass over the flap $a^7$ of the blank, the strips $v^{14}$ during this movement preventing the link from being thrown over forward; and the yoke is then again lowered, when the plate $v^9$ and the rear face of the tooth engage the flap $a^7$ and bend the latter down upon the cover. In this condition, the tray passes beneath the beveled front edge of the cover and enters a rectangular passage, where the parts are held in their assembled positions. A roller $v^{15}$ is journaled in ears formed at the rear of the cover $v^{12}$ and projects below the under face of the cover to crowd the folded tray down upon the belt N, and in position to properly enter the shuck. The shucks, folded flat, are placed in a shuck magazine W that is mounted upon right and left rails X and X', respectively, which latter are secured upon the bed. The rear ends of the rails are supported by a bracket $x$ that is fastened upon the end of the bed and extends horizontally in the plane of its upper face. The said magazine consists of vertical walls, the rearward one of which is preferably open from top to bottom, and the forward one of which is, preferably, provided with a slot, or opening, by which access can be had to the shucks in the magazine. The front and rear walls of the magazine project down between the rails X and X', but terminate above the upper surface of the table and bracket $x$, so as to afford room for a shuck-feeding plunger $x'$ that is mounted upon the bed and bracket and is guided and held down by overhanging portions of the said rails. A coiled spring $x^2$ is secured to the rear end of the plunger and passes around a pulley $x^3$ journaled on a bar that is secured to the bracket $x$, and the opposite end of the spring is secured to a pin fastened upon the said bar. The spring $x^2$ serves to retract the plunger after it has fed a shuck forward. A lug $x^4$ is formed on the plunger near its rear end, and a plug $x^5$ of resilient material, such as rawhide, is seated in a socket in the rear face of the lug $x^4$ and is adapted to strike against a screw $x^6$ that is threaded into a plate which is bolted to the rear ends of the rails X and X', the plunger thus being stopped in its rearward movement without undue jar. A rack bar $x^7$ is mounted to slide in brackets $x^8$ that are respectively secured upon the bed and bracket $x$, and an arm $x^9$ is fastened upon the rack bar and projects rearwardly and then across the space between the rails, the free end of the said arm being held down by a guide bar $x^{10}$ secured upon the top of the rail X. The arm $x^9$ has secured to its upper face a spring plate $x^{11}$ which is provided with an opening for the reception of the upper end of the lug $x^4$ on the plunger, and which is adapted to ride over the upper surface of the said lug, and thus to lock the plunger to the arm $x^9$, and to prevent rebound of the plunger after it has been drawn rearward by its spring. The rack bar is provided on its under face with teeth which engage a segment $x^{12}$ that is fulcrumed on a bracket on the under face of the bed and that projects upward through a slot in the bed. The said segment carries a rock arm $x^{13}$ which is connected by a link $x^{14}$ with a crank arm $x^{15}$ on a stud $x^{16}$, which latter is secured in a bracket on the under side of the bed. The crank arm has fastened to it a pinion $x^{17}$ that engages a gear $x^{18}$ on the shaft of the pulley M.

The rack bar is continuously reciprocated by its gearing, but it is desired to hold the plunger in its forward position while the tray is entering the shuck. For this reason, when the plunger has been advanced by the arm $x^9$ the spring plate $x^{11}$ rides upon an inclined shoulder $x^{19}$ formed on the rear portion of the base of the magazine, and the arm $x^9$ is thus released from the plunger and is free to move rearward. In order to hold the plunger in its forward position, a latch $x^{20}$ projects through an opening in the rail X and engages a shoulder $x^{21}$ formed in the side of the plunger $x'$. The said latch is carried by the free end of a spring $x^{22}$ that is secured to the outer face of the rail X'. A cam $x^{23}$ is fastened or formed on the spring $x^{22}$, and a roll $x^{24}$ is journaled on a block $x^{25}$ that is adjustably fastened upon the rack bar by a thumb screw. When the plunger is forced forward by the arm $x^9$ against the action of the spring $x^2$, the spring plate $x^{11}$ is released, as before described, and the latch $x^{20}$ engages the shoulder $x^{21}$ and holds the plunger in its forward position until the roll $x^{24}$, by riding upon the cam $x^{23}$, releases the latch and allows the spring $x^2$ to retract the plunger. The roll $x^{24}$ draws the latch entirely away from the plunger, so that it exerts no friction upon the latter. The forward end of the plunger is provided with a shoulder $x^{26}$ which is adapted to engage the lowermost shuck and carry it forward; and beyond such shoulder, the plunger is reduced in width and thickness; and its forward end is slotted to permit the passage of the folders on the belt N.

At the point where the magazine W is located, the rails X and X' at the level of the lowest shuck, have their adjacent vertical walls separated by a distance equal to the width of the flattened shuck; but as the rail X' extends forward, its said wall at such level gradually inclines toward the opposite rail, until the distance between the walls at the said level is only equal to the width of the opened shuck. Along such inclined portion, a cam surface $x^{27}$ is formed, which surface, at its rearward end, is horizontal and is gradually warped in a forward direction until, at its forward end, it is merged into the vertical inner face of the rail X. As the shuck is carried forward by the plunger, the inner face of the rail X crowds the top of the shuck over toward the rail X', and the cam surface $x^{27}$ raises the forward upper corner of the shuck until, at the end of the cam surface $x^{27}$ and of the inclined portion of the inner face of the rail X, the shuck assumes a shape which is rectangular in cross section.

A cover Y is hinged to the outer face of the rail X' and overlies such rail and its companion rail. The cover Y consists of front and rear transverse strips $y$ and $y'$, each of which is hinged to a plate that is attached to the rail X, and of a longitudinally extending plate $y^2$ that is secured to the under faces of the plates $y$ and $y'$, the plate $y^2$ being shaped to fit into and close the space between the tops of the rail from the shuck hopper forward to the ends of the rails R. A stripper $y^3$ is pivoted between ears on the plate $y'$, such stripper, preferably, consisting of a back $y^4$, from the edges of which wings $y^5$ extend vertically, the rear ends of the wings forming ears, by which the stripper is pivoted. The lower edges of the wings are inclined to the back plate, so that, when such plate lies upon the plate $y^2$ of the cover, such edges extend forward and downward. The cover Y is slotted to permit the passage of one of the wings $y^5$, the other of which lies beyond the edge of the said plate. When the shuck plunger has carried a shuck forward, the shuck passes under and raises the stripper, so that, when the plunger is retracted, the shuck will strike the forward edges of the wings $y^5$, and be prevented from traveling rearward with the plunger. The cover Y is held down upon the guides by a spring catch $y^6$ that is secured upon the side of the rail X'. On the pintle of the cover $v^{12}$, a guide $v^{16}$ is pivoted. The said guide consists of a plate having an eye at its upper end, in which the pintle is received, and that is curved downwardly and forwardly from the said eye. The said plate swings freely on the pintle.

At the rear ends of the rails R, ears are formed on the outer sides, upon which are secured arms Z, that are formed upon the sides of leaf springs $z$, each of which lies upon the belt N, adjacent to its rail R. The arms Z pass through slots formed in the rails, and are held down upon their ears by plates that are screwed to the said ears. The springs $z$ are bent upward from the belt, slightly, at their rearward ends, so that the mouth of a shuck can ride under such ends. In the inner faces of the rear ends of the rails R, recesses $r^7$ are formed each of which has a vertical wall that is inclined inward rearwardly. A spring $z'$ is secured against each of the said inclined walls, as by a block $z^2$, that is clamped against the spring by a screw $z^3$ passing through the said rail and spring and threaded into the said block. The rear ends of the springs $z'$ extend sufficiently beyond the inner faces of the rails R and R', so that the vertical side of a shuck can ride behind them.

In the operation of the machine above illustrated, the carrier belt is driven at a uniform rate of motion with its upper section moving rearwardly. A strip of tray blanks is passed under the springs $d'$, under the tongue $l'$ of the plate L and over the upper face of the slide F until the shoulders $f^2$ can engage the square corners of the blank. The strip is then fed rearward by the motion of the slide F, each reciprocation of the said slide causing the length of a single blank to be fed. The strip passes over the knife block and under the plates Q. Upon the return movement of the slide F, the scoring disks form the scores between the bottom and cover of the tray and their respective side flaps, and such disks are raised out of contact with the paper along other portions of the blank by the action of the rollers $f^7$ riding upon the rails $f^8$. The knife descends, carrying the plates $k^8$ downward, and the rounded ends of the latter press the strip down in rear of the knife block and then slide rearward upon the strip against the tension of their springs $k^9$ while the knife severs the blank from the strip. The blank being held down by the plates $k^8$ is readily engaged by the vertical arms $n^6$ of the stops $n^4$ and is thus carried through the passageway formed by the belt N, the plates Q and the filling plates under the plates Q. The blank then enters between the rails R, the free edges of its side flaps being engaged by the grooves $r$, and the cover and bottom being held down upon the belt N by the flanges depending from the plate $r'$. This action continues, the side flaps being gradually folded upward by the grooves $r$ until they have been raised sufficiently so that they can hold the cover and bottom down upon the belt when the blank passes out from under the plate $r'$. At this point, the cigarette plunger S, moving rearward, pushes the lower cigarette of each column in the magazine rearward until the cigarettes pass off the plate $r'$ and fall upon the bottom of the tray blank. The belt N carries the tray blank past the card feeding mechanism, which deposits a card on top of the layer of cigarettes. The lower arm of the folder $n^2$ strikes the end of the slot in the plate P and is dragged to a horizontal position, which throws the upper arm into a vertical position, folding up the end wall $a^6$ and the flap $a^7$ of the blank. The tray continues its travel between the rails R, the side flaps being gradually brought more nearly to a vertical position until the cover has passed beyond the grooves $r$; and while the bottom and its side flaps are held between the vertical inner faces of the rails, the cover is folded over, as before described, by means of the yoke V and the link $v^5$. The flap $a^7$ is folded down upon the cover, and the completely folded tray, with the card and cigarettes inclosed, passes beneath the cover $v^{12}$ and under the roller at the rear end of the cover. While the tray has been progressing to the point described, the plunger $x'$ is carried forward by the arm $x^9$ against the tension of the spring $x^2$, and the shoulder, upon the plunger, engages the rear end of the lowermost shuck in the magazine W and carries it forward. The shuck is squared up by the rail X′, as before described, and in such condition passes forward to meet the tray. The shuck advances until the guide Z, which has been turned backward by the tray and the springs $z$ and $z'$ have entered the mouth of the shuck. In this position, all the four front edges of the shuck are guarded so that the tray cannot catch upon any of them. The latch $x^{18}$ engages the shoulder $x^{19}$ in the plunger and prevents its travel rearward with the arm $x^9$, so that the plunger holds the shuck stationary. The folder $n^2$ then forces the tray into the shuck, and when the former has completely entered the latter the roller $x^{24}$ engages the cam $x^{23}$, releases the latch from the plunger, and allows the plunger to be instantly withdrawn by the spring $x^2$. The stripper $y^3$ prevents the completed package from being drawn back by the plunger, and the package falls through the opening in the bed at the rear of the wheel $m$.

I desire it to be understood that there are many changes that can be made in the construction above illustrated which will fall within the scope of my invention. For instance, if the cover of the tray has no side flaps $a^4$, the rails R will not need to be cut back, as at $r^6$, nor will the opposing faces of said rails need to be beveled at said point.

Having thus described my invention, what I claim is:—

1. In a machine for forming packages, the combination with a guideway through which a blank is fed, means arranged in said guideway for folding the blank during its passage therethrough, means for conveying the blank through said guideway, means associated with said guideway for positively introducing and depositing a card in a horizontal position within the blank, and actuating mechanism common to both the blank-conveying and card-depositing means, substantially as described.

2. In a machine for forming packages, the combination with a guideway through which a blank is fed, means arranged in said guideway for folding the blank during its passage therethrough, means for conveying the blank through said guideway, means associated with said guideway for positively introducing and depositing a card in a horizontal position within the blank, said introducing and depositing means being adapted to deposite the card upon the blank before the latter is folded, and actuating mechanism common to both the blank-conveying and card-depositing means, substantially as described.

3. In a machine for forming packages, the combination with a guideway, means for feeding a blank therethrough, means above said guideway for depositing articles in a horizontal position above said blank, means for depositing a card in a horizontal position upon said blank before the latter is folded, means in said guideway for folding said blank, and actuating mechanism common to the blank-feeding, article-depositing, and card-depositing means, substantially as described.

4. In a machine for forming packages, the combination with reciprocable means for feeding a strip of material, guides associated with said strip-feeding means, and springs arranged in advance of said strip-feeding means for pressing upon the strip to prevent buckling of the latter upon the return movement of said feeding means, substantially as described.

5. In a machine for forming packages, the combination of means for feeding a strip, said means having beveled shoulders to engage shoulders upon said strip, and a forwardly-projecting elevated plate that is free at one end and that is adapted to lie upon said strip to keep it in engagement with said shoulders and prevent buckling, said plate being connected to a fixed part of the machine, substantially as described.

6. In a machine for forming packages, the combination of reciprocable means for feeding a strip, said means having beveled shoulders to engage shoulders upon said strip, and a forwardly-projecting elevated plate that is free at one end and that is adapted to lie upon said strip to keep it in engagement with said shoulders and prevent buckling, said plate being connected to a fixed part of the machine, substantially as and for the purpose described.

7. In a machine for forming packages, the combination with means for feeding a blank strip, of a plate arranged above said feeding means and extending over the path of movement of the latter to prevent buckling of the strip, said plate having one of its ends connected to a fixed part of the machine and its other end free.

8. In a machine for forming packages, the combination with means for feeding a blank strip, of a plate arranged above said feeding means and connected to a fixed part of the machine, said plate having an elongated tongue extending over the feeding means to prevent buckling of the strip.

9. In a machine for forming packages, the combination with means for engaging a strip for feeding the latter in one direction, of means associated with said feeding means for scoring the strip when the feeding means are moving in the opposite direction, a plate arranged above said feeding means and extending over the path of movement of the latter to prevent buckling of the strip, said plate having one of its ends connected to a fixed part of the machine and its other end free, and means for severing a blank from said strip during the passage of the latter through the machine, substantially as described.

10. In a machine for forming packages, the combination of a feed slide having means for engaging a strip of material to feed the latter, having means for scoring said strip, and means for throwing said scoring means out of action during portions of the travel of said feed slide, and means in advance of said slide to engage the strip to prevent the same buckling substantially as and for the purpose described.

11. In a machine for forming packages, the combination of a feed slide, a shaft carried by said feed slide and capable of vertical movement with relation thereto, scoring means carried by said shaft, rollers also carried by said shaft, tracks that are adapted to engage said rollers to lift said shaft during portions of the travel of the said slide, and means in advance of said slide to engage the strip to prevent the same buckling substantially as described.

12. In a machine for forming packages, the combination of a feed slide, a shaft mounted in vertical slots in said slide, scoring means, rollers carried by said shaft, springs on said slide adapted to press said shaft downward, tracks upon which said rollers are adapted to run and which are adapted to raise said shaft during a portion of the travel of the slide, and means in advance of said slide to engage the strip to prevent the same buckling substantially as described.

13. In a machine for forming packages, the combination of means for feeding a strip of blanks, a knife for severing a blank from said strip, a carrier upon which the severed blank is adapted to rest and which is adapted to feed the blank, means for depressing the blank upon the said carrier as the knife severs the blank from the strip so that said carrier can engage the blank, and means in advance of said strip-feeding means to engage the strip to prevent the same buckling, substantially as described.

14. In a machine for forming packages, the combination of means for feeding a strip of blanks, a knife for severing a blank from said strip, a carrier upon which the severed blank is adapted to rest and which is adapted to feed the blank, yielding means carried by the knife for depressing the blank upon the said carrier as the knife severs the blank from the strip whereby said carrier can engage the blank, and means in advance of said strip-feeding means to engage the strip to prevent the same buckling, substantially as described.

15. In a machine for forming packages, the combination of a knife block, a knife for severing a blank from the strip of material, a carrier beneath the knife block and having means for engaging and feeding the severed blank, a plate pivoted upon the knife and having its lower edge curved away from and normally extending near to or below the knife, a spring embracing the upper edge of the knife and plate for yieldingly holding said plate toward said knife, and means also carried by the knife for depressing the strip upon the knife block substantially as described.

16. In a machine for forming packages, the combination of a knife block, a knife, means carried by the knife for depressing the strip of material upon the knife block a carrier belt having stops thereon, said stops having under-cut shoulders beneath which a blank can be engaged, folders carried by said belt, means coöperating with said folders for limiting the movement of said folders relatively to said belt, and yielding plates that are pivoted to said knife, that lie upon the side thereof opposite to said knife block, and whose lower ends are bent away from said knife, whereby, when said knife severs the blank from a strip of material, said blank is depressed by said yielding plates, so that it is engaged by a stop upon said carrier, substantially as described.

17. In a machine for forming packages, the combination with a carrier belt having openings therein, folders pivoted in said openings, and means arranged in said openings and coöperating with the folders to limit movement of the latter relatively to said belt, substantially as described.

18. In a machine for forming packages, the combination with a carrier belt having openings therein, of folders arranged in said openings, stops carried by said belt and arranged adjacent to said openings, and means associated with said stops and arranged in said openings for limiting movement of said folders relatively to said belt, substantially as described.

19. In a machine for forming packages, the combination of means for feeding and folding blanks, means for feeding articles upon said blanks, means associated with said article-feeding means for preventing lateral escape from the blanks of the articles as the latter are fed to the blanks, means for driving said parts, and means for detachably connecting said means for feeding articles with its driving means, substantially as and for the purpose described.

20. In a machine for forming packages, the combination of means for feeding and folding blanks, means for depositing articles upon said blanks, means associated with said article-depositing means for preventing lateral escape from the blanks of the articles as the latter are fed to the blanks, a common driving means for the said parts, and means for detachably connecting said means for depositing articles with said driving means, substantially as described.

21. In a machine for forming packages, the combination of means for feeding a strip of material, means for depositing articles upon said strip of material, means associated with said article-depositing means for preventing lateral escape from the blanks of the articles as the latter are fed to the blanks, a common driving means for said parts, and a detachable connection between said means for depositing articles and said driving means, substantially as described.

22. In a machine for forming packages, the combination of means for feeding a strip of material, a magazine for containing cigarettes, a plunger that is adapted to move across and close the lower end of said magazine and to feed the lower cigarettes in said magazine upon a blank, means associated with said magazine for preventing lateral escape from the blank of the cigarettes as the latter are fed from the magazine to the blank, means for driving said parts, and means for detachably connecting said plunger with said driving means, substantially as and for the purpose described.

23. In a machine for forming packages, the combination of means for feeding and folding a strip of material, a cigarette magazine, a plunger that is adapted to feed cigarettes from the bottom of said magazine, means associated with said magazine for preventing lateral escape from the strip of the cigarettes as the latter are fed from the magazine to the strip, a common driving means for said parts, an arm by which said plunger is driven from said driving means, said arm being forked at its plunger-engaging end, and a screw that is adapted to clamp said fork upon the said plunger, substantially as described.

24. In a machine for forming packages, the combination of means for feeding and folding a strip of material, a cigarette magazine, a plunger for feeding cigarettes from said magazine upon said material, means associated with said magazine for preventing lateral escape from the strip of the cigarettes as the latter are fed from the magazine to the strip, a common driving means for said parts, an arm connected with said driving means and adapted to drive said plunger, said arm having a fork that extends in the direction of travel of said plunger, and a screw which is adapted to be received in said fork and to clamp the latter to the plunger, substantially as and for the purpose described.

25. In a machine for forming packages, the combination with means for feeding and folding blanks, means for feeding articles upon said blanks, means associated with said article-feeding means for preventing lateral escape from the blanks of the articles as the latter are fed to the blanks, and means for driving the blank and article-feeding means, substantially as described.

26. In a machine for forming packages, the combination with means for feeding and folding blanks, a cigarette magazine, a plunger associated with said magazine for feeding cigarettes therefrom, means associated with said magazine for preventing lateral escape from the blanks of the cigarettes as the latter are fed to the blanks, and means for driving the blank-feeding means and the plunger, substantially as described.

27. In a machine for forming packages, the combination with a carrier for a blank, of rails at opposite sides of said carrier, said rails having grooves formed therein adapted to engage the side flaps of a blank, said grooves beginning at a level near the carrier and at a distance apart nearly equal to the spread of said flaps, the inclination of said grooves toward each other changing in the direction of travel of the carrier, substantially as described.

28. In a machine for forming packages, the combination with a carrier for blanks, of rails at opposite sides of said carrier, said rails having grooves formed in their opposing faces adapted to engage side flaps on said blanks, said grooves beginning near the plane of the carrier and at a distance apart greater than the width of the body of the blank, the angle of inclination of said grooves toward each other changing in the direction of travel of the carrier, said grooves also having portions which are adapted to overhang the inner faces of said flaps to keep the edges of said flaps in secure engagement in said grooves, substantially as described.

29. In a machine for forming packages, the combination of a carrier, rails on opposite sides of the path of travel of said carrier, said rails having grooves formed therein that are adapted to engage the edges of flaps on said blank when said flaps are spread apart, and to raise said flaps to a vertical position, and said rails being cut away on their opposing faces beyond the ends of said grooves, substantially as described.

30. In a machine for forming packages, the combination of a carrier, rails at each side of the path of travel of said carrier, said rails having grooves for engaging the side flaps on a blank and raising them to a vertical position, the opposing faces of said rails at the termination of said grooves being cut back and beveled away from each other in a direction toward said carrier, substantially as described.

31. In a machine for forming packages, the combination of a carrier, rails upon opposite sides of the path of said carrier, grooves formed in the opposing faces of said rails for raising side flaps upon the bottom and cover of a blank to a vertical position, the opposing faces of said rails being cut back away from each other at the termination of said grooves, and means for folding over the cover of the blank while the body of the blank is held at the termination of said grooves, substantially as described.

32. In a machine for forming packages, the combination with means for folding up the side flaps of the bottom of a blank to a vertical position, means for folding over the cover of the blank while said flaps are so held, and means to operate upon the blank to leave the side flaps of the cover spread apart to permit them passing outside of the side flaps of the bottom, substantially as described.

33. In a machine for forming packages, the combination of means for folding a blank having a cover secured to one end of the body of said blank and having a flap secured to the other end of the body thereof, a tooth, means for giving said blank and said tooth relative motion, whereby said tooth shall engage said cover, raise the same, and depress it upon the body of the blank, and whereby said tooth shall engage the outer face of said end flap and depress said flap upon said cover, and means for limiting the relative movement between the tooth and the blank, substantially as described.

34. In a machine for forming packages, the combination of means for feeding a blank, a yoke pivoted upon opposite sides of the path of said blank, a tooth carried by said yoke, means for depressing said tooth into the path of a cover of said blank, whereby said cover shall ride up upon said tooth, and whereby said tooth shall be raised above the level of the body of said blank and then depressed to fold the cover thereof upon the body of the same, and means for limiting movement of the tooth away from the blank, substantially as described.

35. In a machine for forming packages, the combination of means for feeding a blank, an arm pivoted on opposite sides of the path of said blank, a tooth carried by said arm, means for swinging said arm whereby said tooth shall be depressed to engage and raise a cover of said blank, whereby said tooth shall be raised above the body of said blank, whereby said tooth shall be depressed to fold over the cover of said blank, whereby said tooth shall be raised over a flap at the opposite end of said blank, and whereby said tooth shall be depressed to fold said flap upon the body of said blank, and means for limiting movement of the tooth away from the blank, substantially as described.

36. In a machine for forming packages, the combination of means for carrying a blank, an arm pivoted upon opposite sides of the path of said blank, a tooth carried by said arm, means for moving said arm to cause said tooth to raise and fold over a cover of the blank and for causing it to fold over a flap at the opposite end of said blank from said cover, means for holding said cover down while said end flap is folded, and means for limiting movement of the tooth away from the blank, substantially as described.

37. In a machine for forming packages, the combination of means for carrying a blank, an arm pivoted upon opposite sides of the path of said blank, said arm carrying a tooth, an arm extending from said arm and forming a continuation of the rear face of said tooth, means for moving said first-mentioned arm, whereby the front face of said tooth is adapted to engage and raise a cover attached to the rear end of said blank, and the point of said tooth is adapted to fold said cover upon the body of the blank, and whereby said tooth is then raised over a flap on the forward end of said blank and is depressed to cause its rear face and said arm to fold over said end flap, and means for limiting movement of the tooth away from the blank, substantially as described.

38. In a machine for forming packages, the combination of a carrier for a blank, a yoke pivoted upon opposite sides of the path of said blank, a tooth on said yoke, an arm secured to said yoke, the under surface of said arm forming a continuation of the rear face of said tooth, a link pivoted to said yoke, and means for moving said yoke, whereby said tooth is first depressed near said carrier, its front face is caused to engage and raise a cover attached to the rear end of the body of said blank, said tooth is raised above the body of the blank and said blank allowed to pass under it, and whereby said link is adapted to engage said cover and hold it down upon the body of the blank and said tooth is caused to pass over a flap formed on the front end of the body of said blank, and the rear face of said tooth and the under face of said arm are caused to fold over said flap, substantially as and for the purpose described.

39. In a machine for forming packages, the combination of a carrier belt having means for engaging a blank, a button on said belt which is adapted to raise a cover formed on the rear end of said blank, a yoke pivoted upon opposite sides of the path of said blank, a tooth carried by said yoke to be positioned in the path of travel of the blank, means for moving said yoke whereby said tooth is depressed and caused to engage said raised cover of the blank to fold said cover in an upward direction, and means for limiting said yoke in its upward movement, substantially as described.

40. In a machine for forming packages, the combination of a carrier for a blank, a yoke pivoted upon opposite sides of the path of said carrier, a tooth carried by said yoke to be positioned in the path of travel of the blank, a link pivoted to said yoke and extending rearward therefrom, means for raising and lowering said yoke, and stops on said yoke that are adapted to engage said link to raise the link with the yoke when the latter is raised beyond a given position, substantially as described.

41. In a machine for forming packages, the combination of a carrier for a blank, an arm pivoted at one side of the path of said blank, a tooth carried by said arm to be positioned in the path of travel of the blank, a link pivoted to said arm, a passage beyond the end of said link into which a folded blank is adapted to be carried, and guards to prevent the overthrow of the link when the arm is raised, substantially as and for the purpose described.

42. In a machine for forming packages, the combination of a carrier for a blank, rails upon opposite sides of said carrier, an arm pivoted upon said rails, said arm carrying a tooth, a link pivoted to said arm and adapted to rest upon the tops of said rails, stops on said arm for raising said link with said arm when the latter is raised above a given position, and means for swinging said arm, substantially as and for the purpose described.

43. In a machine for forming packages, the combination of a carrier for a blank, rails upon opposite sides of said carrier, a yoke pivoted upon opposite sides of said rails, said yoke carrying a tooth, a link pivoted to said yoke and adapted to rest upon the tops of said rails, stops on said yoke for raising said link with said yoke when the latter is raised above a given position, and means for swinging said yoke, said rails at a point in front of said yoke having a width substantially equal to the width of the body of the blank and from such point rearward having a width greater than said width, substantially as described.

44. In a machine for forming packages, the combination of a carrier for a blank, rails upon opposite sides of said carrier, a yoke pivoted upon opposite sides of said rails, said yoke carrying a tooth, a link pivoted to said yoke and adapted to rest upon the tops of said rails, stops on said yoke for raising said link with said yoke when the latter is raised above a given position, and means for swinging said yoke, said rails at points in front and in rear of the field of operations of said yoke and link having a width substantially equal to the width of the body of the blank, and in said field of operations having a width greater than said width, substantially as described.

45. In a machine for forming packages, the combination of means for holding a shuck, means for forcing a tray toward said shuck, and a depending freely swinging guide plate that is adapted to enter the mouth of the shuck and to guide the tray thereinto, substantially as described.

46. In a machine for forming packages, the combination with a passageway, of springs arranged in said passageway having free ends projecting at an angle to the walls of said passageway, whereby the mouth of a shuck is received by said springs to permit a tray forced toward said shuck being guided into its mouth, and a depending freely-swinging guide-plate arranged in said passageway and adapted to enter the mouth of the shuck to guide the tray thereinto, substantially as described.

47. In a machine for forming packages, the combination of a guideway, springs secured to the side walls and bottom of said guideway and projecting in the same direction and at an acute angle to the walls thereof, a freely swinging guide plate pivoted at the top of said guideway and depending therefrom, and a roller mounted transversely in the upper portion of said guideway, substantially as described.

48. In a machine for forming packages, the combination of a guide way for trays and shucks, a carrier for trays movable in said guide way, a shuck feeding plunger movable toward and from said carrier, means for advancing said plunger toward said carrier, means for holding said plunger while a tray is being forced into a shuck, and means for quickly withdrawing said plunger, substantially as described.

49. In a machine for forming packages, the combination of a guideway for trays and shucks, a carrier movable continuously in said guide way, a shuck feeding plunger movable toward and from said carrier, means for advancing said plunger toward said carrier, means for holding said plunger while a tray is being forced into a shuck, and means for quickly withdrawing said plunger, substantially as described.

50. In a machine for forming packages, the combination of a guide way for shucks, a plunger movable therein, regularly reciprocating means for advancing said plunger, a latch for holding said plunger in its advanced position, a spring bearing upon said plunger and a relatively immovable part for causing a quick return of said plunger and means for releasing said latch, substantially as described.

51. In a machine for forming packages, the combination of a guide way for shucks, a plunger movable therein, a regularly reciprocating bar movable parallel to said guide way, an arm carried by said bar and adapted to engage said plunger to advance it, a latch for holding said plunger in its advanced position, a lug carried by said bar for releasing said latch, and a spring for returning the plunger, substantially as described.

52. In a machine for forming packages, the combination of a guide way for shucks, a plunger movable therein, a bar regularly reciprocable, parallel to said guide way, an arm carried by said bar and adapted to advance said plunger, a latch that is adapted to hold said plunger in its advanced position, a spring for retracting said plunger, and a spring-catch that is adapted to connect said plunger and said arm to prevent a rebound of the plunger, substantially as described.

In testimony that I claim the foregoing I have hereunto set my hand this 16th day of January, A. D. 1902.

JACOB P. WRIGHT.

Witnesses:
  B. C. Ross,
  O. A. Tickner.